(12) United States Patent
Lerner et al.

(10) Patent No.: US 6,948,296 B1
(45) Date of Patent: Sep. 27, 2005

(54) DUNNAGE MATERIAL AND PROCESS

(75) Inventors: Bernard Lerner, Aurora, OH (US); Rick S. Wehrmann, Hudson, OH (US)

(73) Assignee: Automated Packaging Systems, Inc., Streetsboro, OH (US)

( * ) Notice: Subject to any disclaimer, the term of this patent is extended or adjusted under 35 U.S.C. 154(b) by 0 days.

(21) Appl. No.: 09/979,256

(22) PCT Filed: May 18, 2000

(86) PCT No.: PCT/US00/13784

§ 371 (c)(1),
(2), (4) Date: Mar. 28, 2002

(87) PCT Pub. No.: WO00/71423

PCT Pub. Date: Nov. 30, 2000

Related U.S. Application Data

(63) Continuation-in-part of application No. 09/315,413, filed on May 20, 1999, now Pat. No. 6,199,349.

(51) Int. Cl.[7] .............................................. B67B 5/00
(52) U.S. Cl. ........................... 53/476; 53/469; 53/567; 493/967; 493/239
(58) Field of Search .......................... 53/472, 469, 468, 53/567, 385.1, 476; 493/967, 239

(56) References Cited

U.S. PATENT DOCUMENTS

| | | |
|---|---|---|
| 3,254,828 A | 6/1966 | Lerner |
| 3,298,156 A | 1/1967 | Lerner |
| 3,414,140 A | 12/1968 | Feldkamp |
| 3,462,027 A | 8/1969 | Puckhaber |
| 3,477,196 A | 11/1969 | Lerner |
| 3,523,055 A | 8/1970 | Lemelson |
| 3,575,757 A | 4/1971 | Smith |
| 3,575,781 A | 4/1971 | Pezely |
| 3,577,305 A | 5/1971 | Hines et al. |
| 3,616,155 A | 10/1971 | Chavannes |
| 3,650,877 A | 3/1972 | Johnson |
| 3,730,240 A | 5/1973 | Presnick |
| 3,808,981 A | 5/1974 | Shaw |
| 3,817,803 A | 6/1974 | Horsley |
| 3,837,990 A | 9/1974 | McConell et al. |
| 3,837,991 A | 9/1974 | Evans |
| 3,938,298 A | 2/1976 | Luhman et al. |
| 3,939,995 A | 2/1976 | Baxter |
| 4,017,351 A | 4/1977 | Larson et al. |
| 4,040,526 A | 8/1977 | Baxter et al. |
| 4,044,693 A | 8/1977 | Ramsey, Jr. |
| 4,076,872 A | 2/1978 | Lewicki et al. |
| 4,096,306 A | 6/1978 | Larson |
| 4,102,364 A | 7/1978 | Leslie et al. |

(Continued)

*Primary Examiner*—Sameh H. Tawfik
(74) *Attorney, Agent, or Firm*—Calfee, Halter & Griswold LLP

(57) ABSTRACT

A process of forming dunnage is disclosed. A chain of interconnected plastic pouches (38) are fed along a path of travel to a fill and seal station (24). The pouches (38) are sequentially opened as each pouch is positioned in the fill station. Each pouch is opened by directing a flow of air through a pouch fill opening (50) to separate a face (46) from a back (48) of each such pouch and continuing the flow of air through each such opening to inflate each opened pouch. Each such inflated pouch is then sealed to create hermetically closed and inflated dunnage units (56). Novel web and dunnage units are also disclosed.

7 Claims, 4 Drawing Sheets

U.S. PATENT DOCUMENTS

| | | |
|---|---|---|
| 4,146,069 A | 3/1979 | Angarola et al. |
| 4,201,029 A | 5/1980 | Lerner |
| 4,314,865 A | 2/1982 | Ottaviano |
| 4,354,004 A | 10/1982 | Hughes et al. |
| 4,518,654 A | 5/1985 | Eichbauer et al. |
| 4,564,407 A | 1/1986 | Tsuruta |
| 4,576,669 A | 3/1986 | Caputo |
| 4,597,244 A | 7/1986 | Pharo |
| 4,619,635 A | 10/1986 | Ottaviano |
| 4,793,123 A | 12/1988 | Pharo |
| 4,874,093 A | 10/1989 | Pharo |
| 4,904,092 A | 2/1990 | Campbell et al. |
| 4,918,904 A | 4/1990 | Pharo |
| 4,931,033 A | 6/1990 | Leeds |
| 5,117,608 A | 6/1992 | Nease et al. |
| 5,188,691 A | 2/1993 | Caputo |
| 5,203,761 A | 4/1993 | Reichental et al. |
| 5,216,868 A | 6/1993 | Cooper et al. |
| 5,272,856 A | 12/1993 | Pharo |
| 5,351,828 A | 10/1994 | Becker et al. |
| 5,394,676 A | 3/1995 | Lerner |
| 5,470,300 A | 11/1995 | Terranova |
| 5,552,003 A | 9/1996 | Hoover et al. |
| 5,693,163 A | 12/1997 | Hoover et al. |

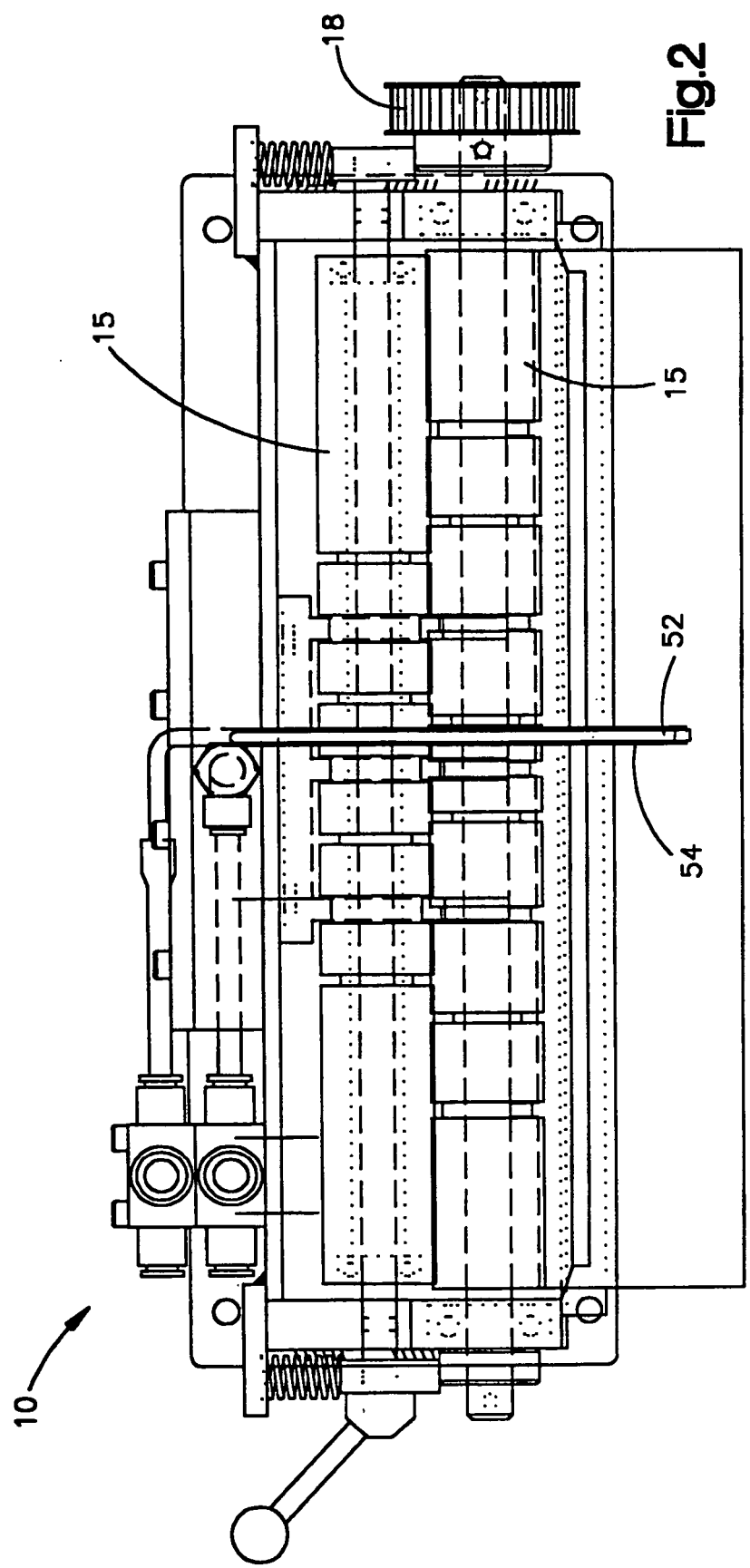

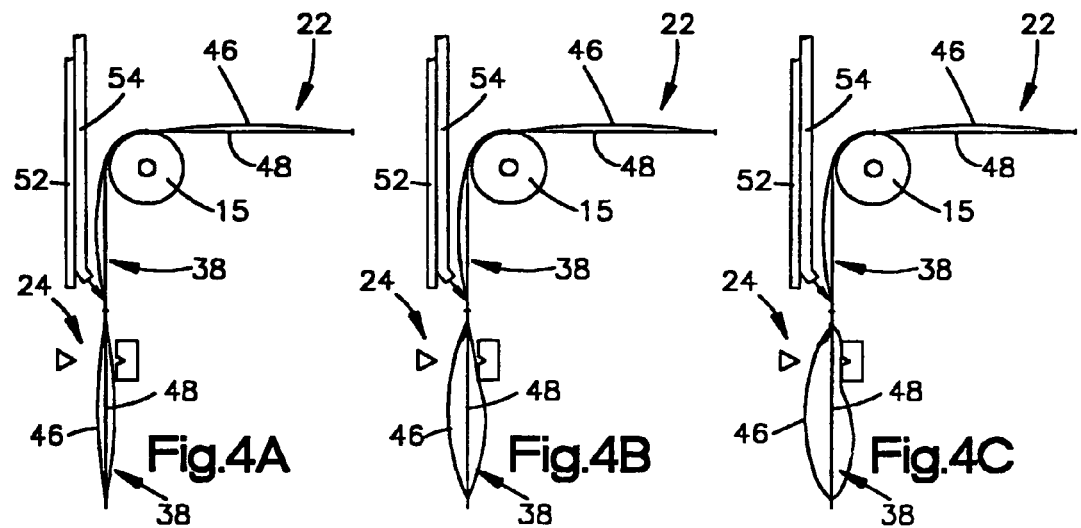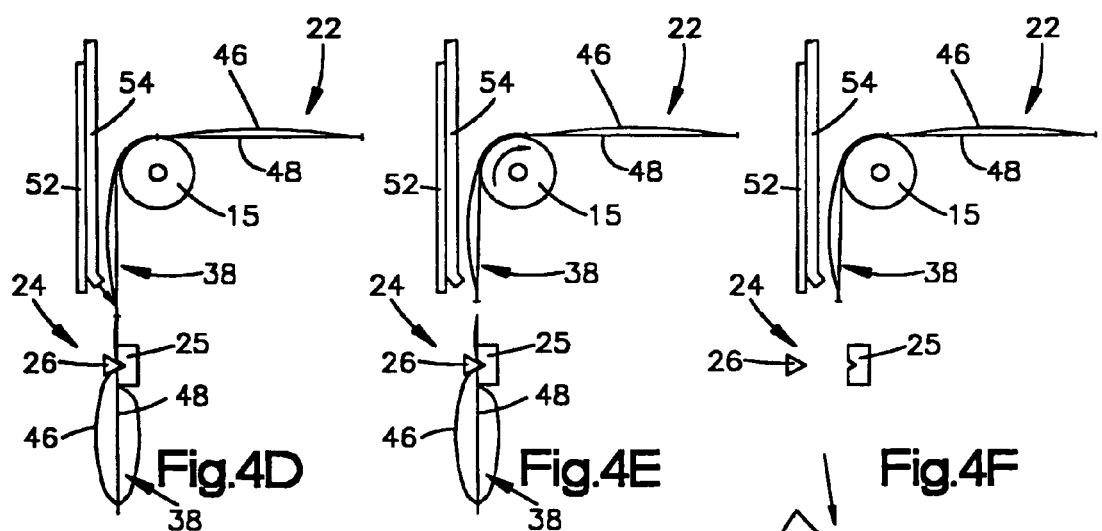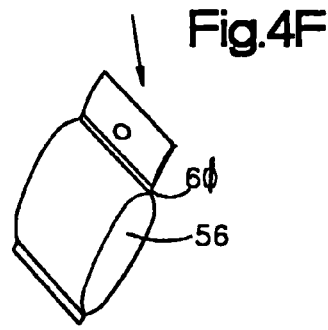

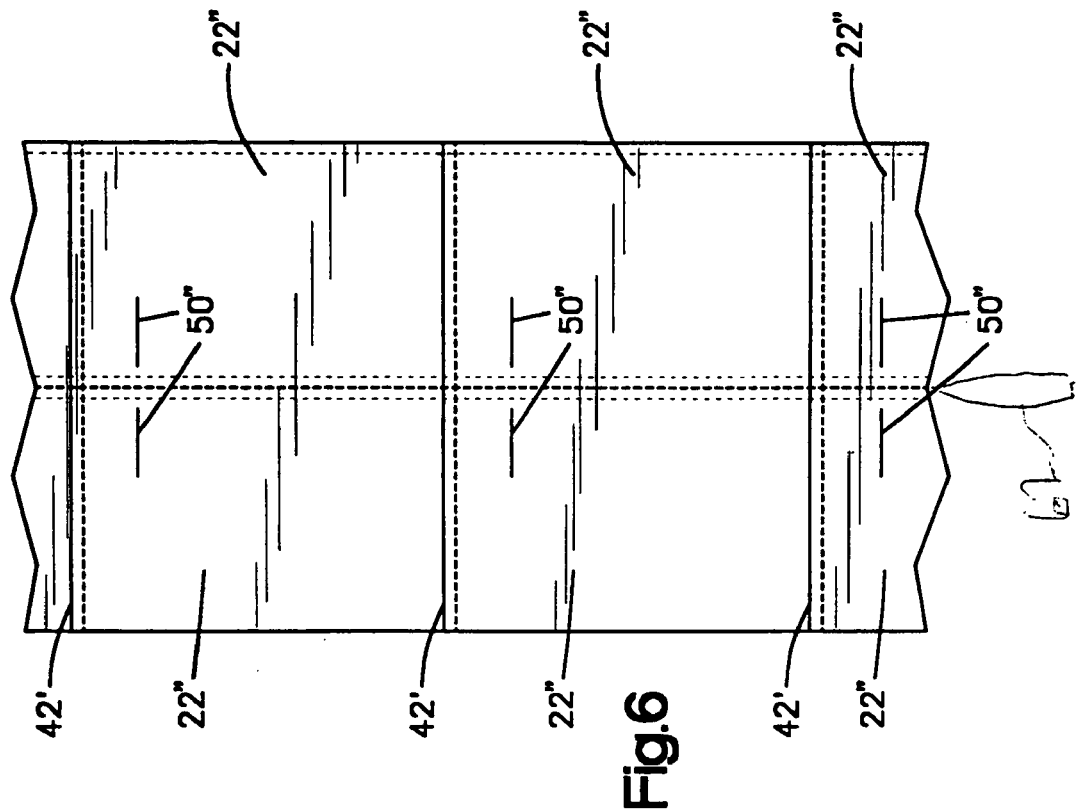
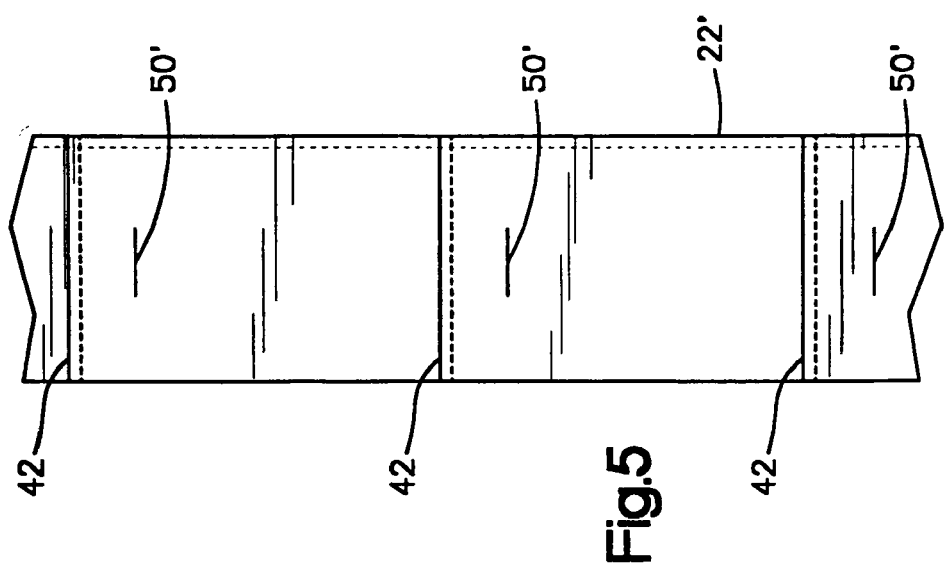

DUNNAGE MATERIAL AND PROCESS

This application is a 371 of of PCT/US00/13784- May 18, 2000 which is a CIP of Ser. No. 09/315,413 filed May 20, 1999 now U.S. Pat. No. 6,199,349.

TECHNICAL FIELD

This invention relates to dunnage and more particularly to a novel and improved web of interconnected dunnage pouches and a process of producing dunnage with such a web.

BACKGROUND ART

U.S. Pat. Nos. 5,552,003 and 5,693,163 respectively entitled "Method for Producing Inflated Dunnage" and "Inflated Dunnage and Method for Its Production" and respectively issued Sep. 3, 1996 and Dec. 2, 1997 to Gregory k Hoover et al. (the Dunnage Patents) disclose a method for producing dunnage utilizing preopened bags on a roll. The preopened bags utilized in the Dunnage Patents are of a type disclosed in U.S. Pat. No. 3,254,828 issued Jun. 2, 1996 to Hershey Lerner and entitled "Flexible Container Strips" (the "Autobag Patent"). The preferred bags of the Dunnage Patents are unique in that the so-called tack of outer bag surfaces is greater than the tack of inner surfaces to facilitate bag opening while producing dunnage units which stick to one another when in use.

SUMMARY OF THE INVENTION

The present invention enhances the production of dunnage with a system which is an improvement over the process disclosed in the Dunnage Patents. Specifically, with the present invention a web in the form of a chain of interconnected pouches is provided. Each of the pouches is closed other than for a small fill opening in the form of a slit or cut out in its face. Thus, the pouches contrast with bags fully open across a top portion as is the case with the Dunnage Patents and the preferred chains of bags taught in the Autobag Patent.

The use of small fill openings obviates a problem that exists with the approach taught by the Dunnage Patents. Specifically, if either the face or back of a bag as used in the Dunnage Patents is uneven, such as by wrinkling, a seal will not be fully hermetic and air will leak from th dunnage unit. With the pouches of the present invention consistent hermetic seals are produced and air leakage from dunnage units is avoided.

A "double up" arrangement is provided for some applications such as when higher volume is desired. With the so-called double up arrangement, two side connected strips of interconnected pouches are provided. The side connections are preferably frangible to facilitate ready separation of the strips. Preferably slit openings are provided near the top of each pouch and near the side connections in order that a single source of air can concurrently inflate two pouches, one in each strip.

In producing dunnage with the improved chain of pouches, a bagging machine of the type disclosed and claimed in U.S. Pat. No. 5,394,676 issued Mar. 7, 1995 to Bernard Lerner et al. under the title "Packaging Machine and Method" (the "Excel Patent") is utilized. The machine is modified to provide an air nozzle which emits a continuous flow of air during a dunnage formation portion of a cycle. The continuous flow of air is directed at the small, preferably a slit opening of a pouch positioned at a fill station. The continuous air flow is from a nozzle directed at the pouch opening and preferably aligned such that the axis of the constantly flowing air intersects web slightly above an opening of a pouch being inflated. The intersection of the axis is at an obtuse angle as measured outwardly of the machine. The flow is diverted downwardly by the web to pass through the opening of the pouch being inflated.

Once the constant flow of air has inflated a pouch, the flow is continued until shortly before a heat sealer has closed on the inflated pouch to effect a seal closing the pouch in an inflated condition to trap the inflation air in the pouch. In order to control the pressure within a pouch being sealed the machine is further modified so that some air is expelled from the pouch immediately prior to seal closure. Air is expelled so that heat from the sealer will not cause air within the pouch to expand until the pouch is ruptured.

The seal is an hermetic closure formed between front and back layers of the pouch such that the hermetic closure surrounds the space. The hermetic closure consists of side folds or seals and a bottom seal formed as the chain of pouches is produced and the closure seal effected after the bag has been inflated.

The machine modification which effects the air expulsion is the provision of coacting elements to engage the face and back of an inflated pouch at locations spaced from a location where a seal is to be formed. In the preferred arrangement the elements are respectively fixed relative to a sealer bar and sealer pad. As the bar and pad are relatively moved toward one another to compress an inflated pouch for sealing the elements are relatively moved toward one another into compressing, air expelling engagement with the inflated pouch.

Accordingly, the objects of the invention are to provide a novel and improved chain of interconnected pouches, a process of producing dunnage units with those pouches and novel and improved dunnage units.

BRIEF DESCRIPTION OF DRAWINGS

FIG. 2 is an elevational view of the machine's fill station;

FIGS. 4A–F are a schematic sequential showing of the dunnage formation process of the present invention;

FIG. 5 is a plan view corresponding to FIG. 3 showing the now preferred web; and FIG. 6 is a plan view corresponding to FIGS. 3 and 5 showing the double-up web of the present invention.

DETAILED DESCRIPTION OF THE DRAWINGS

Figure 1:
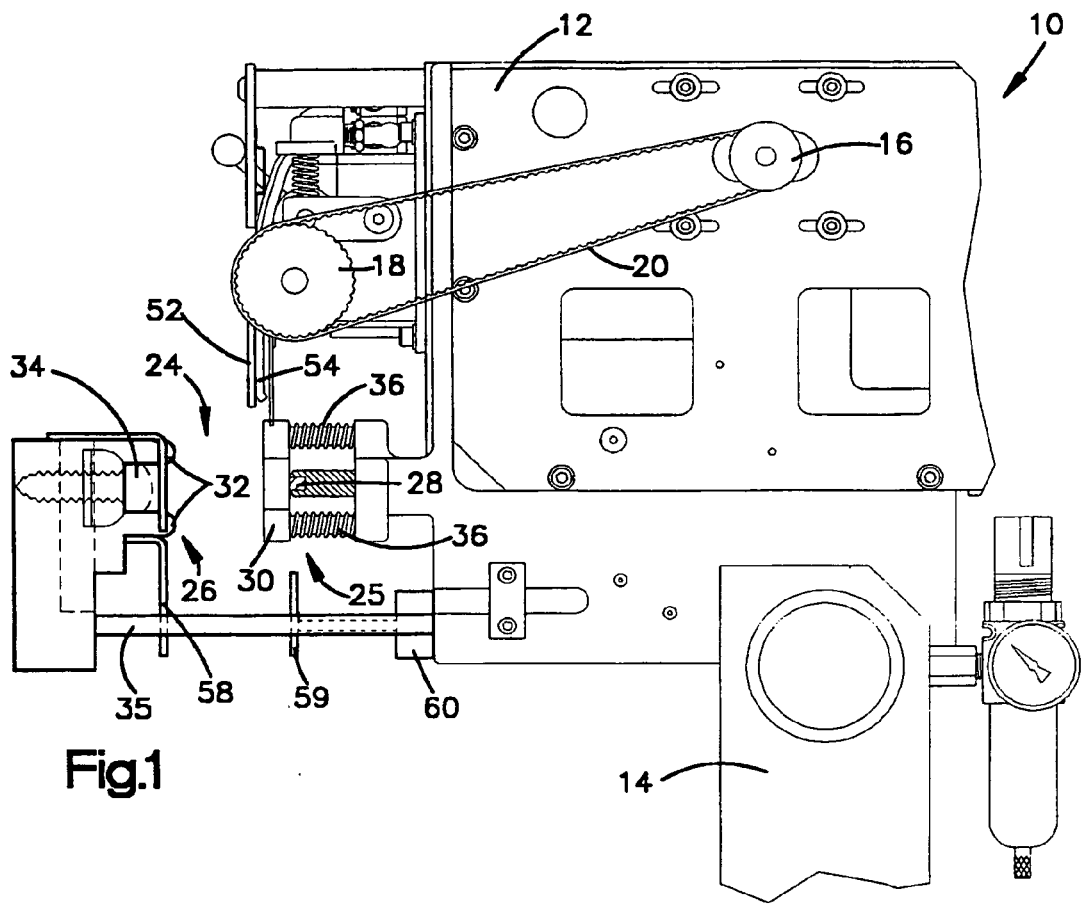
FIG. 1 is a fragmentary side elevational view of the machine of the Excel Patent modified in accordance with the present invention.

FIGS. 1 and 2 correspond respectively to FIGS. 2A and 7 of the Excel Patent modified to embody features to enable practice of the method of the present invention. The present disclosure of the machine of the Excel Patent will be limited to that portion of the machine which enables practice of the present invention. For a complete description of the entire machine of the Excel Patent, we hereby incorporate the Excel Patent by reference.

Referring to the drawings and to FIG. 1 in particular, a fragmentary section of the machine of the Excel Patent is shown generally at 10. The machine includes a section 12 known as a bagger which is mounted on a support post 14.

The bagger 12 includes a pair of oppositely rotatable feed rolls 15, FIG. 2. Feed roll drive is accomplished through a motor not shown which is operatively connected to a drive wheel 16. The drive wheel 16 in turn drives a feed roll drive wheel 18 via a belt 20. The drive wheels are intermittently rotated to feed a web 22 through the machine and outwardly and downwardly to an inflation or fill and seal station shown generally at 24.

A web sealer is provided that includes sealer and pressure pad subassemblies 25, 26. The sealer subassembly includes a fixedly mounted heat element 28 and a spring biased protective plate 30. The pressure pad subassembly 26 is mounted on a pair of reciprocatable rods 35, one of which is shown in FIG. 1. The rods in turn are connected to a suitable drive such as a cylinder which, on energization, will shift the sealer pad subassembly to the right as viewed in FIG. 1 until the projections 32 clamp an inflated pouch against the protective plate 30. Further travel of the rods press the protective plate against the action of springs 36 until a portion of the web 22 to be sealed is clamped between the heater bar 28 and the pressure pad 24 whereupon a seal is effected.

Figure 3:
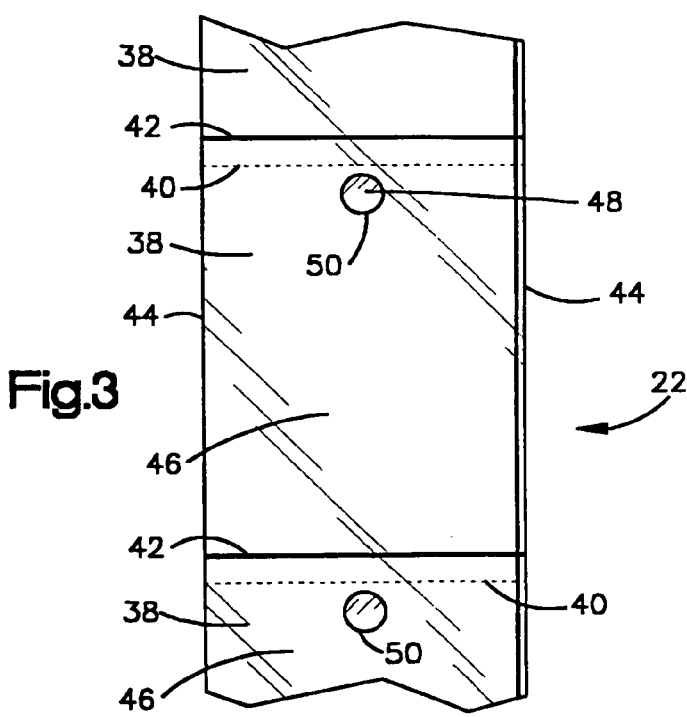
FIG. 3 is an plan view of a section of one embodiment of the web of this invention.

One embodiment of the web 22 is best shown in FIG. 3. The web is a flattened plastic tube which includes a series of interconnected pouches 38 with adjacent pouches being joined together by lines of weakness in the form of perforations 40. Thus, the lines of weakness delineate the ends of the interconnected pouches and facilitate the subsequent separation of the web into dunnage units.

Each pouch 38 has a bottom delineated by an endless bottom seal 42. The spaced sides 44 are delineated by either folds or seals, such that a fill space for each pouch between the faces 46 and backs of 48 of the pouches is delineated by the seal 42 and the sides of 44. Each pouch face has a circular fill opening 50 50' formed between the sides 44 and as close as practical to the bottom seal 42 of the next pouch in the web to maximize the size of the fillable space in the pouch. In FIGS. 5 and 6 fill openings 50' in a now preferred slit form are disclosed. Each opening 50 is close to or into the line of weakness 40 delineating the top of that pouch. Tests have shown that slit openings 50' work very well. The slit openings provide maximized size of dunnage units from any given pouch size.

In order to avoid wrinkles and resultant leaky dunnage units, each fill opening 50 or 50' is midway between the sides 42 and has a transverse dimension of the order of twenty-five percent of the width of the web or less. The longitudinal dimension of each circular or oval fill opening should be at least ½ the transverse dimension of the same fill opening.

The web 22 is formed of a heat sealable plastic, preferably polyethylene. While the present process can be effected with a plain polyethylene material, it is preferable that inner surfaces of the faces and backs 46, 48 have relatively low tack to enable quick and reliable opening of each pouch as it is positioned at the fill station. For many applications the outer surfaces preferably have a tack greater than the inner surfaces. It is necessary that the outer surfaces are of sufficient tackiness to cause the dunnage units to stick together sufficiently to resist relative movement when protecting a packaged heavy object. The differences in tack between the inner and outer surfaces are achieved by forming the web from either a coextruded film or a film which has a coating of a tack different than the tack of the film which it coats.

While the currently preferred machine does not have it, the machine may have the usual intermittent air nozzle 52 which at an appropriate time in a machine cycle emits a puff of air to separate the face 46 from the back 48 of a pouch 38 registered at the fill station 24. Whether the intermittent nozzle 52 is present or not, a relatively large fill nozzle 54 is provided. The fill nozzle is provided for formation of dunnage units according to the present invention and as such is an addition to the machine of Excel Patent. With the circular fill openings 50 a fill nozzle with a circular outlet is preferred. Thus, it is desirable to have complementally contoured nozzle outlets and fill openings.

Tests were conducted with a fill nozzle having a circular outlet opening ¼ inch in diameter. The fill nozzle was consistently effective in inflating pouches having circular fill openings ⅜ inch in diameter. Thus, tests have shown that a fill nozzle having an inside diameter of the order of ⅔ the diameter of the fill openings 50 produces outstanding results. In the tests, and as disclosed here, an extension of the axis of the fill nozzle 54 intersects the web slightly above and vertically aligned with the center of a fill opening of a load station positioned pouch. The intersection of the air flow with the web is at an obtuse angle as measured from the front of the machine.

Tests of the slit openings 50' have shown that not only are they highly effective to open and direct a flow of air into pouches, but the alignment of an air nozzle with the slit opening is less critical than is alignment with a circular or oval opening 50.

Tests have also shown that on occasion the heat of sealing an inflated pouch can cause the air within the pouch to expand to the point that the pouch ruptures. Moreover, pouches filled with the thus far described equipment contain a volume of air under relatively high pressure such that the dunnage units are of rather firm and in flexible shape. It has been discovered that if the volume of air within the pouch is controlled to something less than maximized volume, the pressure of the volume of air within the pouch once completed is such that rupturing as a result of the sealing process is avoided. Moreover, controlled lower pressure than achieved with the system as previously described enables some amount of compression of the finished dunnage units to, for example, be stuffed between an item being packaged and the wall of the package.

The mechanism for controlling air pressure within a pouch is shown in FIG. 1. The mechanism includes a pad plate 58 fixed to and forming a part of the pressure pad assembly 26. The pad plate 58 is positioned to engage the face of a pouch as the subassembly 26 closes to effect the seal.

Concurrently, a sealer plate 59 is advanced outwardly by a cylinder 60 to engage the back of the fill pouch being sealed. Thus, the pad and sealer plates 58, 59 function to squeeze the pouch and expel some air from the filled pouch being sealed.

Operation

In operation, the motor which drives the drive wheel 16 is energized to advance the web 22 until one of the pouches 38 is registered at the fill station as indicated schematically in FIG. 4A. With the described web and the machine of the Excel Patent, this registration is accomplished through the use of a spark gap detector. When one of the lines of weakness 40 passes between electrodes of a spark gap detector, a spark passes between the electrodes resulting in a signal which stops the web feed. Thus, the lines of weakness function as registration indicia. Alternatively a registration system such as that described and claimed in U.S. Pat. No. 4,680,208 may be employed.

Once a pouch is located at the fill station, if the machine is equipped with an intermittent nozzle 52, a puff of air through the intermittent nozzle 52 against the fill opening 50 or 50' separates the face 46 from the back 48 of the registered pouch, FIG. 4B. When the machine is equipped with an intermittent nozzle, following pouch opening, a continuous flow of air from fill nozzle 54 is initiated and directed through the now aligned opening 50 or 50' of the pouch until it reaches a fully inflated condition shown in FIG. 4C. In the preferred arrangement, a positioned pouch is both opened and filled by a flow of air from the fill nozzle 54. The flow of fill air is directed against the web at a location longitudinally aligned with the fill opening of a pouch registered in the fill and seal station. The air flows downwardly along the surface of the web and through the fill opening into the fillable space of the registered pouch.

Once the registered pouch has been fully inflated, the pressure pad subassembly 26 is shifted to the right as viewed in the drawings. The pad plate 58 which depends below the sealer pad in fixed relationship engages the front of a pouch being sealed. Concurrently, the cylinder 60 is extended to move th sealer plate 59 into engagement with the back of the pouch being sealed. As the subassembly shifting and cylinder 60 extension continues the plates 58, 59 act to expel some air from the inflated pouch prior to sealer bar and sealer pad compression of the pouch to effect a seal. The air expulsion controls the air pressure within the pouch being sealed and prevents pouch rupture due to seal heat induced air expansion.

As movement of the subassembly 26 concludes, the protective plate 30 will have been shifted to the right as viewed in FIG. 1 against the action of the springs 36 until the pouch being sealed is clamped between the pad 34 and the heater bar 28 to effect a seal between the face and the back as depicted in FIG. 4D. Once the filled pouch is clamped between the projections 32 and the protective plate 30, the flow of air from the fill nozzle is terminated. The seal being effected is a transverse seal 61 extending from side to side to complete an hermetic seal surrounding the now filled fillable space within the pouch, such that the fill opening 50 or 50' no longer communicates with the fillable space within the pouch.

As a pouch is being sealed, the drive wheel 16 and the rolls 15 are counter-rotated a short distance to separate the filled pouch from the web, FIG. 4E. On opening of the seal assembly, the filled pouch which is now a dunnage unit 56, is dropped from the machine as indicated in FIG. 4F. Optionally, two or more dunnage units will be formed before the separation operation, so that one can produce a chain of dunnage units of a predetermined selected length.

Each produced dunnage unit is a body formed from plastic film. The body defines an hermetically enclosed space filled with air. The body has an outer surface which is sufficiently tacky to adhere to a body of a like dunnage unit. The body of each unit is of generally rectangular configuration with a pair of lips projecting from one side of the body, the lips having been formed by one of the seals 61. One of the lips includes a cut out which formerly was one of the fill openings 50.

As is apparent from an examination of FIG. 6, it is fully within the scope of this invention to concurrently feed two or more webs or chains of pouches and to provide as many fill nozzles 54 as there are webs. With so-called "multiple up" webs that is two or more adjacent and interconnected chains of longitudinally interconnected pouches 22", a plow 62 is preferably positioned between adjacent chains to rupture frangible interconnections between the chains as such a web is fed through the machine 10. Moreover, it is possible to provide chains of dunnage units by separating the units from the web only after chains of the desired number of units have been formed. Thus, separation occurs every other sealing operation for chains of two, every third operation for chains of three and so on.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and scope of the invention as hereinafter claimed.

What is claimed is:

1. A process of forming dunnage elements comprising:
 a) feeding a chain of interconnected plastic pouches each having a width along a path of travel to an inflation station;
 b) sequentially opening each of a plurality of pouches as each such pouch is at the inflation station by directing a flow of air from a first nozzle along a face of such pouch at the inflation station through a small fill opening substantially transversely centered in the face of each pouch, the fill opening no more than 25 percent of the width of the pouch, the opening step being performed as to each pouch as it is positioned in the inflation station, thereby separating the face from the back of each such puch;
 c) directing a steady flow of air from a second nozzle through each such fill opening of each opened pouch to substantially completely inflate each opened pouch; and
 d) sealing each such inflated pouch to close each such fill opening and thereby create hermetically closed and inflated dunnage units.

2. A process of creating dunnage elements comprising:
 a) feeding a chain of interconnected pouches along a path of travel through a machine;
 b) each of the pouches having a width and a relatively small fill opening near the top of a pouch face and being hermetically closed at least along spaced sides and a bottom, each fill opening having a transverse dimension of approximately one fourth the width of the bag or less;
 c) sequentially sensing each of a series of spaced registration indicia to stop the feeding of the chain and thereby sequentially register each of the pouches at a fill station;
 d) opening each such registered pouch by directing a flow of air from a first nozzle along the face of the registered pouch and through the fill opening of the registered pouch to separate a face and a back of the registered pouch;
 e) inflating and filling each open pouch with air by directing a steady flow of air from a second nozzle through the fill opening of the open pouch into a fill space;
 f) sealing the face to the back of each inflated pouch to close off the fill opening of the inflated pouch and complete an hermetic closure around the fill space and thereby produce an inflated dunnage unit; and,
 g) preventing over inflation by controlling the volume of the inflation of each pouch prior to the sealing step.

3. A process of making dunnage units comprising
a) feeding a chain of interconnected plastic pouches along a path of travel to sequentially position the pouches at a fill station;
b) directing a flow of gas through a fill opening of each positioned pouch to inflate positioned pouch;
c) controlling the volume of gas in each such inflated pouch by compressing a face and a back of the inflated pouch toward one another with compressor elements to prevent the pouch from rupturing during a subsequent sealing step; and,
d) thereafter sealing the pouch with sealer elements spaced from the compressor elements to form an inflated dunnage unit.

4. The process of claim 3 wherein/he volume control step is effected by coaction of the compressor elements as they are moved toward one another.

5. The process of claim 4 wherein a prime mover is interposed between one of the compressor elements and a body of a machine used in performing the process of claim 4.

6. The process of claim 5 wherein the one element is a seal bar element.

7. A process of forming dunnage elements comprising:
a) feeding a chain of interconnected plastic pouches each having a width along a path of travel to an inflation station;
b) sequentially opening each of a plurality of pouches as each such pouch is at the inflation station by directing a flow of air along a face of such pouch at the inflation station through a small fill opening substantially transversely centered in a face of each pouch, the fill opening having a cross-sectional area and a width no more than 25 percent of the width of the pouch;
c) the flow of air being from an outlet having a cross-sectional area of approximately ⅔ of the cross-sectional area of the fill opening;
d) the opening step being performed as to each pouch as it is positioned in the inflation station, thereby separating the face from the back of each such pouch;
e) directing a steady flow of air from an outlet through each such fill opening of each opened pouch to substantially completely inflate each opened pouch;
f) sealing each such inflated pouch to close each such fill opening and thereby create hermetically closed and inflated dunnage units; and
g) an imaginary extension of an axis of the outlet being in a common imaginary plane with an axis of the fill opening of a pouch being inflated, the outlet axis is being at an obtuse angle relative to a face of a pouch being filled during the inflation step.

* * * * *